United States Patent [19]
Wada et al.

[11] Patent Number: 5,432,016
[45] Date of Patent: Jul. 11, 1995

[54] MAGNETIC HEAD SLIDER MATERIAL

[75] Inventors: Toshiaki Wada, Takatsuki; Seiichi Hirao, Amagasaki; Toyoshige Sasaki, Fukuoka; Masaharu Shiroyama, Fukuoka; Mitsuhiko Furukawa, Fukuoka, all of Japan

[73] Assignees: Sumitomo Special Metals Co., Ltd., Osaka; Nippon Tungsten Co., Ltd., Fukuoka, both of Japan

[21] Appl. No.: 713,368

[22] Filed: Jun. 11, 1994

[30] Foreign Application Priority Data

Jun. 21, 1990 [JP] Japan .................... 2-164731

[51] Int. Cl.⁶ ............................. B32B 19/00
[52] U.S. Cl. ..................... 428/692; 360/110; 423/62; 423/65; 428/702; 428/900; 501/103; 501/104
[58] Field of Search ............. 360/110, 122; 428/328, 428/331, 702, 701, 692, 900, 402, 694 R; 501/103, 104; 423/62, 65

[56] References Cited

U.S. PATENT DOCUMENTS

| | | | |
|---|---|---|---|
| 4,660,114 | 4/1987 | Yamakawa et al. | 360/122 |
| 4,734,802 | 3/1988 | Higuchi et al. | 360/103 |
| 4,796,127 | 1/1989 | Wada et al. | 360/103 |
| 4,814,915 | 3/1989 | Wada et al. | 360/103 |
| 4,835,640 | 5/1989 | Endo et al. | 360/103 |
| 4,902,651 | 2/1990 | Wada et al. | 501/87 |
| 5,008,221 | 4/1991 | Ketcham | 501/103 |
| 5,061,576 | 10/1991 | Shimizu et al. | 428/694 |

FOREIGN PATENT DOCUMENTS

| | | |
|---|---|---|
| 0137134 | 4/1985 | European Pat. Off. |
| 0142781 | 5/1985 | European Pat. Off. |
| 3535023 | 4/1986 | Germany |
| 60-66406 | 4/1985 | Japan |
| 62-04882 | 1/1987 | Japan |
| 63-098816 | 4/1988 | Japan |
| 63-134562 | 6/1988 | Japan |
| 0323257 | 1/1991 | Japan |

OTHER PUBLICATIONS

French Search Report dated Mar. 19, 1993.

*Primary Examiner*—D. S. Nakarani
*Assistant Examiner*—H. Thi Lê
*Attorney, Agent, or Firm*—Fish & Richardson

[57] ABSTRACT

A material for a magnetic head slider consists essentially of 0.1 to 20.0 vol % of at least one of oxides the group Va elements of the International Periodic Table (Ta, Nb, V) and 80.0 to 99.9 vol % of stabilized cubic $ZrO_2$ containing a stabilizer ($Y_2O_3$, MgO, $CeO_2$). It has improved precision machinability, machining efficiency, high strength, densified structure, affinity with the recording medium or lubricity, besides wear resistance. It may be machined precisely into a thin film magnetic head slider with a reduced amount of chipping.

10 Claims, 1 Drawing Sheet

○ DISK WEAR INDEX
● PIN WEAR INDEX

MAGNETIC HEAD SLIDER MATERIAL

FILED OF THE INVENTION

This invention relates to a material for a magnetic head slider for magnetic recording and/or reproduction (reading) for audio devices, video tape recorders (VTRs) or electronic computers, and a material for wear-resistant functional parts coming in contact with a magnetic tape.

BACKGROUND

Heretofore, polycrystalline Ni-Zn ferrite, Mn-Zn ferrite, single-crystal Mn-Zn ferrite or high-hardness permalloy, have been used as a material for magnetic head-sliders for magnetic recording and/or reproduction.

The recent tendency is towards a higher recording density and higher wear resistance of the head slider material and, for this reason, a thin film magnetic head is being used in an increasing volume. In keeping up with acceptance of the thin film magnetic head, an optimum material which will satisfy the properties required of each of the magnetic circuit members for magnetic recording and/or reproduction and the wear-resistant slider has been under development as a material for magnetic circuit members or as a slider material.

Thus thin films of permalloy, sendust or amorphous metal having superior magnetic properties in the high frequency range are preferentially employed as a material for magnetic circuit members. On the other hand, alumina based materials are thought to be desirable as a material for functional members for which high wear resistance is required.

For the wear resistant material for sliding members, which is a nonmagnetic material, precision machinability, machining efficiency, high strength, dense structure, affinity (or compatibility) with the recording medium, lubricity and thermal matching properties with respect to thin metal films, have been required besides the wear resistance.

DISCUSSION OF THE RELATED ART

The JP Patent KOKAI Publication No. 55-163665 (1980) discloses an $Al_2O_3$-TiC material as a magnetic head slider material. Although $Al_2O_3$-TiC is one of the optimum materials especially for the wear-resistant functional components, it cannot be said to be completely satisfactory insofar as the affinity with the recording material, lubricity, precision machinability and, above all, yield of machining (or machining efficiency), are concerned.

The JP Patent KOKAI Publication No. 57-198573 (1979) also discloses an $Al_2O_3$-TiC based material exhibiting improved lubricity and improved affinity with respect to the recording medium. However, this material is inferior in machinability or mechanical properties, above all, yield of machining, so that it cannot be said to be desirable as the magnetic head slider material.

On the other hand, the JP Patent KOKAI Publication No. 60-171617 (1985) discloses a zirconia-based ceramic substrate for a thin-film magnetic head as a material with improvement in chipping during the slicing process. However, with a material mainly consisting of partially stabilized $ZrO_2$, not only the problem of thermal degradation is encountered, but monoclinic crystals tend to be increased as a result of heating up to several hundreds degrees Centigrade and subsequent cooling in the course of film formation on the substrate, while strength tends to be lowered or substrate warping may be produced with changes in the volumetric capacity.

Also the JP Patent KOKAI Publication No. 63-98816 (1988) discloses a material for a substrate for a magnetic head containing 0.1 to 20 wt. % of $Al_2O_3$, with $Nb_2O_5$ and $TiO_2$ being added to stabilized zirconia for improving chipping resistance and sliding performance.

However, this material also is not satisfactory when used as a magnetic head slider material, because chipping tends to be produced or a desired high precision cannot be realized when complicated machining and precision machining is to be performed with respect to the mechanical strength.

SUMMARY OF THE DISCLOSURE

It is therefore a principal object of the present invention to provide a material for a magnetic head slider which is improved not only in wear resistance, but also in precision machinability, machining efficiency, high strength, densification of the structure and affinity with respect to the recording medium, above all, in precision machinability, strength and lubricity, which are required of the wear-resistant functional members of the magnetic head slider.

For accomplishing the above object, the present invention provides a material for a magnetic head slider in which at least one of oxides of the group Va elements according to the International Periodic Table is present together with $ZrO_2$ containing a stabilizer and in which $ZrO_2$ forms a cubic structure in a composite phase structure combined with the oxide(s) of the group Va element(s), said cubic structure accounting for not less than 80 vol % of the entire crystal structure.

The magnetic head-slider material of the present invention satisfies requirements for the wear-resistance which is the requirement for wear-resistant functional members of the magnetic head slider, as well as precision machinability, machining efficiency, high strength, densified structure, affinity with the recording medium and lubricity etc., above all, precision machinability, strength and lubricity, so that it may be machined precisely into a thin film magnetic head slider with a reduced amount of chipping.

Other objects of the present invention will become apparent in the entire disclosure.

BRIEF DESCRIPTION OF THE DRAWINGS

The sole figure shows the results of a pin-disk system frictional wear test.

DESCRIPTION OF THE PREFERRED EMBODIMENTS

Figure 1:
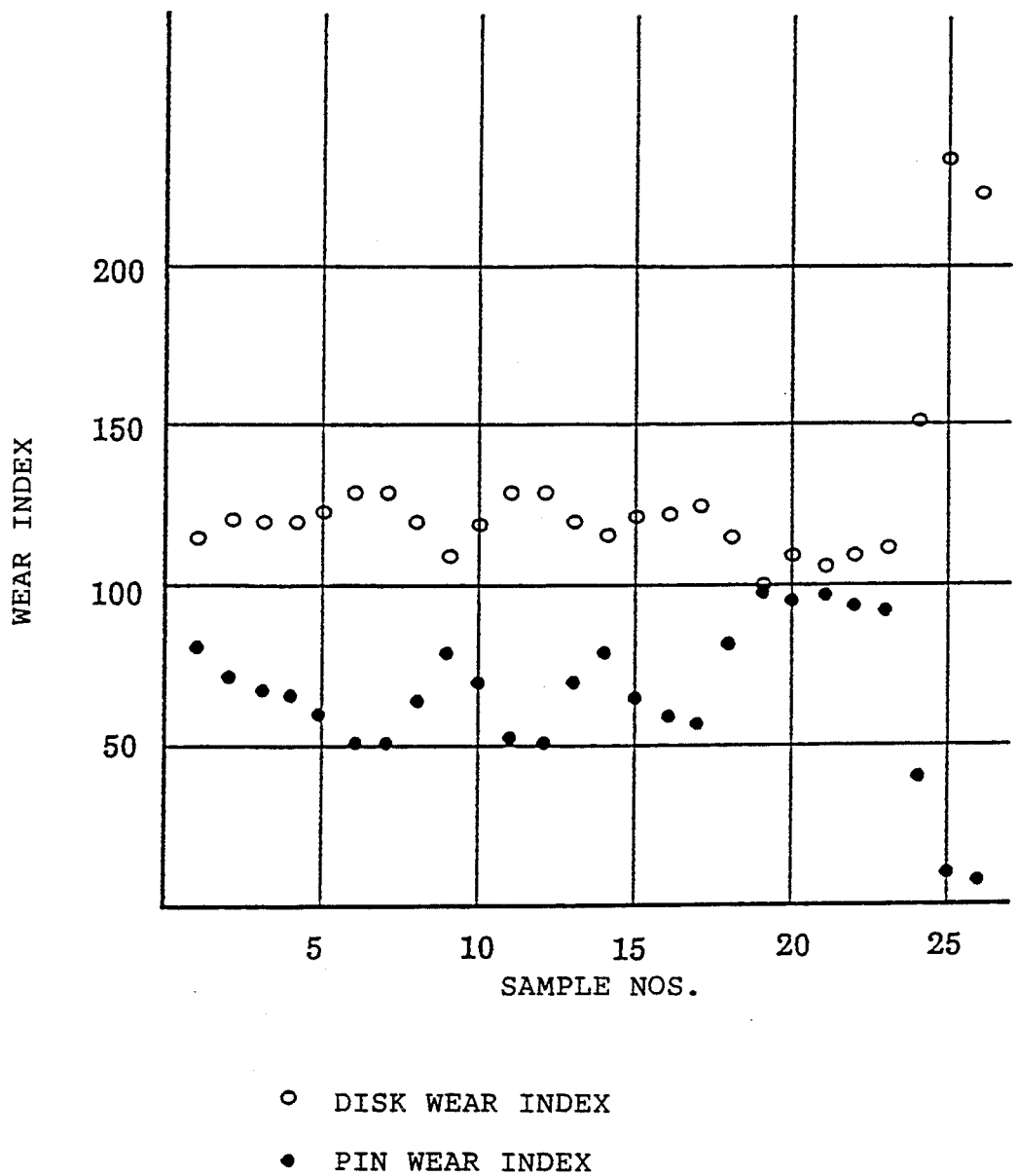

For substantially providing a cubic $ZrO_2$ crystal structure, at least one of $Y_2O_3$, MgO and $CeO_2$ needs to be incorporated in $ZrO_2$ as a stabilizer. The amount of the stabilizer is 10.5 wt. % or more, 4.3 wt. % or more or 13.4 wt. % or more if the stabilizer is $Y_2O_3$, MgO or $CeO_2$, respectively.

The presence of the tetragonal $ZrO_2$ crystals gives rise to transformation, in response to an external stress, from the tetragonal system to the monoclinic system, as a result of which the mechanical properties, above all, the strength and toughness, are improved under the mechanism of the so-called stress-induced transformation.

On the other hand, while the cubic $ZrO_2$ in general tends to undergo the growth of crystal grains, by combining it with at least one of the oxides of the group Va elements, such as $Ta_2O_5$, $V_2O_5$ and $Nb_2O_5$ etc. into a composite phase structure, the crystal size of $ZrO_2$ becomes finer and becomes not more than 1.5 $\mu$m (preferably further not more than 1 $\mu$m) in terms of the mean crystal size as a result of the formation of the composite phase structure. Thus the chipping may be reduced and densification and wear resistance of the material may be improved, while the aforementioned problem of thermal degradation may also be eliminated.

According to the present invention, the $ZrO_2$ component containing the stabilizer(s) is present in combination with the oxide(s) of the group Va element(s), in which the $ZrO_2$ component occupies the major part of the material. If the amount of the cubic $ZrO_2$ component containing the stabilizer is less than 80 vol % or not less than 99.9 vol %, the strength and/or toughness of the resultant material falls short such that chipping or lubricity during the slicing process cannot be improved as compared with the conventional $Al_2O_3$-TiC material.

Although the addition of the oxide(s) of the group Va element(s) is effective in improving lubricating (or sliding) properties of the material with respect to the recording medium, the amount of the oxide(s) less than 0.1 vol % has only limited effects, whereas the amount of the oxide(s) in excess of 20.0 vol % undesirably gives rise to formation of inhomogeneous phases or to growth of crystal grains with consequent lowering of the strength and toughness. Preferably, $Ta_2O_5$ ranges 5-20 vol %, and 5-15 vol % for $Nb_2O_5$ or $V_2O_5$, respectively. Below the preferred range, it tends to short of fining of $ZrO_2$ grains, whereas exceeding the range, it tends to lowering of strength and toughness due to occurrence of the inhomogeneous phases.

In preparing the material of the magnetic head slider of the present invention, separate batches each containing a predetermined amount of fully stabilized $ZrO_2$ prepared through the co-precipitation method with a predetermined amount of $Y_2O_3$, MgO or $CeO_2$ as the stabilizer are subjected to mixing and wet pulverization each with a predetermined amount of $Ta_2O_3$, $V_2O_5$ or $Nb_2O_5$ powders. Each of the resulting powder mixture batches is dried and granulated to produce raw powders. As to the raw powders, it is also possible to use powders prepared through co-precipitation of a mixed solution of zirconium chloride and yttrium chloride or the like with a solution of halogenide of the Va group elements into the above mentioned composition.

Each of these raw powder batches is charged into a graphite mold and hot pressed at an optimum sintering temperature of 1300° to 1600° C. under a pressure of 100 to 300 kgf/cm². The raw powder batches are maintained and sintered in this state for a predetermined time to produce $ZrO_2$ ceramic sintered bodies each containing at least one of $Ta_2O_5$,$V_2O_5$ and $Nb_2O_5$ and having a relative density of 99% or higher.

The $ZrO_2$ ceramic sintered body may also be prepared by hot isostatic pressing (HIP). Thus the raw powders are molded by metal mold pressing, cold isostatic pressing, slip casting or by the doctor blade method, and the resulting molded body is pre-sintered in the atmosphere at a temperature of 1350° to 1600° C. to a relative density of 94.5% or higher. The resulting pre-sintered body is pressed by HIP at a temperature of 1200° to 1500° C. to produce a $ZrO_2$ based ceramic sintered body.

The $ZrO_2$ ceramic sintered body, prepared in this manner, is cut to the shape of a magnetic head slider and finish-machined to a finished magnetic head slider.

EXAMPLES

Stabilized $ZrO_2$ powders, containing $Y_2O_3$, obtained by co-precipitation, in proportions shown in Table 1, as the stabilizer, are mixed with $Ta_2O_5$, $Nb_2O_5$ or $V_2O_5$ powders, having a purity of 99.9% and a mean particle size of 0.5 $\mu$m, in proportions shown in table 1. The resulting mass was mixed and pulverized in a zirconia ball mill for 24 hours, using methanol as a solvent, dried and granulated to starting raw powders.

The starting raw powders were charged into a graphite mold 50 mm in width, 50 mm in width and 60 mm in height and pressed at an optimum sintering temperature of 1400° to 1600° C. under a pressure of 100 to 300 kgf/cm². The starting raw powders were maintained in this state for 60 minutes so as to be then relieved of pressure and allowed to cool to produce a sintered body having a size of 50×50×5.5 mm. The density of the sintered body was measured by the Archimedes method and divided by the theoretial density to find the relative density. The mean crystal grains of $ZrO_2$ was determined by an optical metal-microscope after the thermal etching at 1500° C. made in a hydrogen atmosphere within an electric furnace, using a sample piece of a sintered body, a cut-off surface of which had been subjected to lapping to a surface roughness of 0.1 $\mu$m or less by a diamond paste. The sample Nos. 1-18 showed mean crystal grain sizes of not more than 1.5 $\mu$m, whereas comparative samples Nos. 19-23 showed mean crystal grain sizes of $ZrO_2$ of 4 to 5 $\mu$m or larger.

For evaluating cutting machinability and chipping-resistant properties, each test piece was fixed by a jig and a weight of 10 kgf was attached thereto by the interposition of a pulley, and a test of cutting the test pieces to a length of 50 mm was conducted under the load of the weight. The time which elapsed until the test pieces were cut-off was measured for evaluating the cutting machinability, while the possible presence of chipping produced during the cutting machining and the degree of chipping produced were observed for evaluating chipping-resistant properties. Various physical properties and the results of evaluation are shown in Table 1.

In Table 1, the machinability index was obtained by dividing the cutting time for each of the test pieces by the cutting time for the stabilized $ZrO_2$ of the Comparative Example shown in Table 1, as the reference time, and multiplying the resulting quotients by 100.

It is seen from Table 1 that the $ZrO_2$ base material of the present invention is excellent in chipping-resistant properties to permit high precision machining as compared with the conventional $Al_2O_3$-TiC material.

The sintered body thus produced was formed into a rectangular piece having a cross-sectional size of 3.5×4 mm and a length of 20 mm, with the aid of a diamond grinding wheel, and one end face of the piece was formed into a sharp cutting edge. A so-called pin-disk system frictional wear test was then conducted in which a doughnut-shaped ferrite piece having an outer diameter of 45 mm, an inner diameter of 10 mm and a thickness of 10 mm was rotated about its axis in contact with the sharp edge of the sintered body. The results of the test are shown in FIG. 1.

It is seen from FIG. 1 that the $ZrO_2$ base material of the present invention does not cause wear to the material in contact therewith and hence is excellent in lubricating properties as compared with the conventional $Al_2O_3$-TiC base material.

It is seen from the above test results that the $ZrO_2$ base material according to the present invention meets the properties required of the magnetic head slider material and, with the use of $Ta_2O_3$ as the oxide, an exceedingly high strength may be obtained as compared with the conventional magnetic head material No. 19 based on completely stabilized $ZrO_2$.

Comparative sample No. 24 is partially stabilized zirconia (tetragonal) which is unsuitable for the magnetic head material requiring the heat treatment, since it offers the problem of the thermal transformation. The bending strength of Table 1 was measured by the three-point bending test according to JIS R 1601.

In the embodiments of the present invention, the $ZrO_2$ component is present almost in the cubic crystal structure. However, a very small amount of other crystal phases (tetragonal and/or monoclinic phases) might be present to an extent such that is difficult to quantitively determine.

As is disclosed hereinabove, the present invention also relates to the method for producing the magnetic head slider and more particularly relates to the magnetic head slider or the magnetic head made of the inventive material.

It should be noted that modifications obvious in the art may be done without departing form the gist arid scope as disclosed herein and claimed hereinbelow.

sufficient to stabilize the $ZrO_2$ in the cubic crystal structure.

2. The material according to claim 1 wherein said oxide of the group Va elements is selected from the group consisting of $Ta_2O_5$, $V_2O_5$ and $Nb_2O_5$.

3. The material according to claim 1, wherein the stabilizer is $Y_2O_3$ in an amount of 10.5 wt % or more, MgO in an amount of 4.3 wt % or more, or $CeO_2$ in an amount of 13.4 wt % or more, based on the weight of the stabilized cubic zirconia.

4. The material according to claim 1 wherein the cubic $ZrO_2$ has a mean crystal grain size of 1.5 $\mu$m or less.

5. The material according to claim 1 which has a relative density of 99% or more.

6. The material according to claim 1 obtained by sintering stabilized $ZrO_2$ powders which have been obtained by a co-precipitation method.

7. The material according to claim 1 obtained by hot pressing starting material powders for producing said material at a sintering temperature of 1300° to 1600° C. under a pressure of 100 to 300 kgf/cm$^2$ so that said material has a relative density of 99% or more Of theoretical density.

8. The material according to claim 1 wherein said material has been produced by pre-sintering a molded mass of a mixture of stabilized $ZrO_2$ powders and oxide powders of the Va group elements at 1350° to 1600° C. up to a relative density of 94.5% or higher, and further sintering the resulting pre-sintered product by hot isostatic pressing at 1200° to 1500° C. up to a relative density of 99% or more.

TABLE 1

| Sample | | $ZrO_2$ (Vol %) (Stabilizer mol %) per $ZrO_2$ | Va elements** (Vol %) | Relative density (%) | Hardness $H_RA$ | Bending strength kgf/mm$^2$ | Machinability | Chipping resistance |
|---|---|---|---|---|---|---|---|---|
| WITHIN | 1 | 99.9(8.6 mol % $Y_2O_3$) | 0.1% $Ta_2O_5$ | 99.3 | 91.0 | 40.0 | 110 | 25 |
| THE | 2 | 99.5(8.6 mol % $Y_2O_3$) | 0.5% | 99.4 | 91.3 | 42.0 | 115 | 20 |
| INVENTION | 3 | 99.0(8.6 mol % $Y_2O_3$) | 1.0% | 99.4 | 91.3 | 45.0 | 120 | 15 |
| | 4 | 97.0(8.6 mol % $Y_2O_3$) | 3.0% | 99.7 | 91.5 | 43.0 | 120 | 10 |
| | 5 | 95.0(8.6 mol % $Y_2O_3$) | 5.0% | 99.9 | 92.0 | 48.0 | 125 | 10 |
| | 6 | 90.0(8.6 mol % $Y_2O_3$) | 10.0% | 99.9 | 92.3 | 61.0 | 125 | 5 |
| | 7 | 85.0(8.6 mol % $Y_2O_3$) | 15.0% | 99.9 | 92.5 | 55.0 | 125 | 10 |
| | 8 | 80.0(8.6 mol % $Y_2O_3$) | 20.0% | 99.9 | 91.8 | 42.0 | 115 | 15 |
| | 9 | 99.0(8.6 mol % $Y_2O_3$) | 1.0% $Nb_2O_5$ | 99.6 | 91.5 | 45.0 | 115 | 20 |
| | 10 | 97.0(8.6 mol % $Y_2O_3$) | 3.0% | 99.8 | 91.6 | 45.0 | 120 | 15 |
| | 11 | 95.0(8.6 mol % $Y_2O_3$) | 5.0% | 99.9 | 92.2 | 49.0 | 125 | 15 |
| | 12 | 90.0(8.6 mol % $Y_2O_3$) | 10.0% | 99.9 | 92.2 | 51.0 | 130 | 10 |
| | 13 | 80.0(8.6 mol % $Y_2O_3$) | 20.0% | 99.9 | 91.7 | 41.0 | 110 | 15 |
| | 14 | 99.0(8.6 mol % $Y_2O_3$) | 1.0% $V_2O_5$ | 99.5 | 91.4 | 41.0 | 110 | 20 |
| | 15 | 97.0(8.6 mol % $Y_2O_3$) | 3.0% | 99.7 | 91.8 | 44.0 | 115 | 15 |
| | 16 | 95.0(8.6 mol % $Y_2O_3$) | 5.0% | 99.9 | 92.0 | 47.0 | 120 | 15 |
| | 17 | 90.0(8.6 mol % $Y_2O_3$) | 10.0% | 99.9 | 92.3 | 53.0 | 125 | 10 |
| | 18 | 80.0(8.6 mol % $Y_2O_3$) | 20.0% | 99.9 | 91.8 | 42.0 | 110 | 15 |
| OUTSIDE | 19 | 100.0(8.6 mol % $Y_2O_3$) | | 95.3 | 89.5 | 31.0 | 100 | 80 |
| | 20 | 75.0(8.6 mol % $Y_2O_3$) | 25.0% $Ta_2O_5$ | 99.9 | 90.8 | 27.0 | 95 | 40 |
| | 21 | 70.0(8.6 mol % $Y_2O_3$) | 30.0% $Ta_2O_5$ | 99.9 | 89.3 | 20.0 | 90 | 70 |
| | 22 | 75.0(8.6 mol % $Y_2O_3$) | 25.0% $Nb_2O_5$ | 99.9 | 90.3 | 26.0 | 95 | 40 |
| | 23 | 75.0(8.6 mol % $Y_2O_3$) | 25.0% $V_2O_5$ | 99.9 | 90.5 | 23.0 | 90 | 45 |
| COMP* | 24 | 100.0(5.4 wt % $Y_2O_3$) | | 99.2 | 91.5 | 153.0 | 170 | 10 |
| | 25 | $Al_2O_3$-1.0 wt % MgO | | 99.6 | 93.5 | 70.0 | 210 | 120 |
| | 26 | $Al_2O_3$-30 wt % TiC | | 99.5 | 94.0 | 85.0 | 50 | 100 |

*Comparative example
**Additional elements

What is claimed is:

1. A material for a magnetic head slider consisting essentially of 0.1 to 20.0 volume percent of at least one oxide selected from the group consisting of oxides of the group Va elements of the International Periodic Table and 80.0 to 99.9 volume percent of stabilized cubic $ZrO_2$ containing a stabilizer selected from the group consisting of $Y_2O_3$, MgO and $CeO_2$ in an amount 9. A magnetic head slider made of a material consisting essentially of 0.1 to 20.0 volume percent of at least one selected from the group consisting of oxides of the group Va elements of the International Periodic Table and 80.0 to 99.9 volume percent of stabilized cubic $ZrO_2$ containing a stabilizer selected from the group consisting of $Y_2O_3$, MgO and $CeO_2$ in an amount sufficient to stabilize the $ZrO_2$ in the cubic crystal structure.

10. A magnet head comprising a magnetic head slider made of a material consisting essentially of 0.1 to 20.0 volume percent of at least one selected from the group consisting of oxides of the group Va elements of the International Periodic Table and 80.0 to 99.9 volume percent of stabilized cubic $ZrO_2$ containing a stabilizer selected from the group consisting of $Y_2O_3$, MgO and $CeO_2$ in an amount sufficient to stabilize the $ZrO_2$ in the cubic crystal structure.

* * * * *

UNITED STATES PATENT AND TRADEMARK OFFICE
CERTIFICATE OF CORRECTION

PATENT NO. : 5,432,016

DATED : July 11, 1995

INVENTOR(S) : Toshiaki WADA, Seiichi HIRAO, Toyoshige SASAKI, Masaharu SHIROYAMA, Mitsuhiko FURAKAWA It is certified that error appears in the above-identified patent and that said Letters Patent is hereby corrected as shown below:

On the title page,

Item [22] should read --June 11, 1991--.

Signed and Sealed this

Fourteenth Day of November, 1995

Attest:

BRUCE LEHMAN

*Attesting Officer*   Commissioner of Patents and Trademarks